June 24, 1969

L. PARKIN 3,451,455

FASTENER FOR ANCHORING A NUT

Filed Aug. 14, 1967

INVENTOR
LESLIE PARKIN
BY Philip E. Parker
ATTORNEY

United States Patent Office 3,451,455
Patented June 24, 1969

3,451,455
FASTENER FOR ANCHORING A NUT
Leslie Parkin, Bobbers Mill, England, assignor, by mesne assignments, to United-Carr Incorporated, Boston, Mass., a corporation of Delaware
Filed Aug. 14, 1967, Ser. No. 660,518
Claims priority, application Great Britain, Aug. 16, 1966, 36,628/66
Int. Cl. F16b 39/00, 13/04, 33/04
U.S. Cl. 151—41.73                                    1 Claim

ABSTRACT OF THE DISCLOSURE

A fastener for non-rotatably anchoring a nut in a recess in a support, comprising a hollow body having side walls formed with integral resilient tongues which are displaced laterally by the nut as it is drawn axially into the body so that pointed ends of the tongues are driven into the sides of the recess.

This invention relates to a fastener for anchoring a nut in a recess or aperture in a support.

*Summary of the invention*

The present invention provides a nut anchoring fastener comprising a hollow body adapted to be mounted in a recess or aperture in a support to anchor a nut in non-rotatable relation but permit relative axial movement of the nut within the body, the body being formed with one or more resilient tongues having free ends directed laterally outwardly of the body and portions normally disposed inwardly of the body, the arrangement being such that axial movement of a nut located in the body will be adapted to engage and laterally displace the said other portions so as to cause the free ends to be displaced outwardly into locking engagement with the wall of the recess or aperture.

The said inwardly extending portion of the tongue is disposed at an angle to the axis of the said body so that as the nut is moved axially, the lateral displacement of the inwardly extending portion is progressively increased.

Any number of tongues may be provided, each formed integrally with wall portions of the body by cutting and bending the material thereof.

The wall of the body may comprise a plurality of wall segments arranged to define a hexagonal-like shape for non-rotatably receiving a hexagonally shaped nut, each of the segments being shaped in the form of a pointed prong at its outer end adapted to be driven into the base of a recess in a support with which the fastener is assembled.

To enable the invention to be fully understood, it will now be described, by way of example, with reference to the accompanying drawings, in which.

Figure 1:
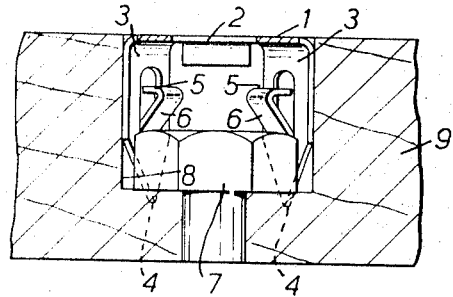
FIGURE 1 is a sectional view of a fastener according to one embodiment of the invention assembled in a recess in a support with a nut positioned within the fastener.
Figure 2:
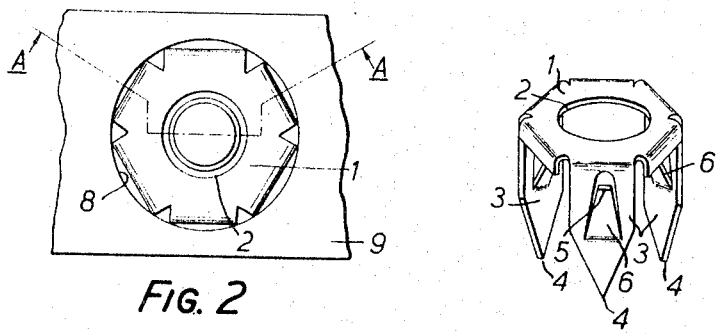
FIGURE 2 is a plan view of the assembly illustrated in FIGURE 1.
Figure 4:
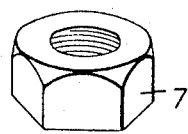
FIGURE 4 is an exploded perspective view of the fastener and nut illustrated in the other figures of the drawings.

As shown in the drawings, the nut anchoring fastener comprises a hollow cage-like including a base 1 having a central aperture 2 and a plurality of laterally spaced side walls 3 extending integrally from the base, the walls having pointed ends 4.

Part of the material of the wall is cut and bent to provide a resilient tongue including a pointed free or outer end portion 5 extending laterally outwards of the body substantially normal to the longitudinal axis thereof and inner end portions 6 which, as indicated in FIGURE 1, initially extend inwardly of the body at an angle to the longitudinal axis thereof.

The particular embodiment illustrated in the drawings accompanying the provisional specification is designed for anchoring a conventional hexagonally shaped nut 7 in a recess 8 in a wooden support 9. The nut is first positioned in the recess so as to rest on the bottom and the fastener is then inserted so that the walls 3 are disposed in a plane parallel to flat faces of the nut whereby the nut is held against rotation relative to the body of the fastener. The fastener is initially secured by driving it axially into the recess to force the pointed ends 4 of the segments into the bottom of the recess.

In use, a bolt 10 is adapted to make screw threaded engagement with the nut to secure an article such as that indicated by 11 to the support 9. The shank of the bolt is inserted through the aperture 2 in the base 1 of the fastener and as it is screwed into the nut, the latter not being free to rotate, will ride up the nut towards its head 12 and thereby moves axially within the recess towards the base 1 of the fastener. As it rides up, the nut engages the portion 6 of the resilient tongues and flexes them laterally outwardly so that the free ends 5 are driven into the wall of the recess whereby the fastener is secured to the support 9 and the nut made captive.

The angle of the portion 6 of the tongues is so arranged that the lateral displacement is imparted to them by the nut in a progressive manner. Accordingly, when the nut initially engages the lower ends of the portion 6, they will be deflected only a small amount into engagement with the wall of the recess. As, however, the axial movement of the nut progresses, it will exert a greater force on the portion 6 so that the free ends of the tongues will be driven into the wall of the recess. It will be understood that the inclination of the tongue portion 6 will be such that the resultant of the forces exerted by the nut as it moves axially upwardly of the bolt will be mainly directed to effect the lateral displacement of the tongues and there will be no tendency for the fastener to be moved bodily out of the recess by the said movement of the nut.

The cross-sectional shape of the hollow body of the anchoring fastener may be varied according to the shape of the nut to be anchored and in the case, for example, of a square-shaped nut four walls such as 3 will be provided to define four sides of a square and engage the four flat faces of the nut.

Figure 3:
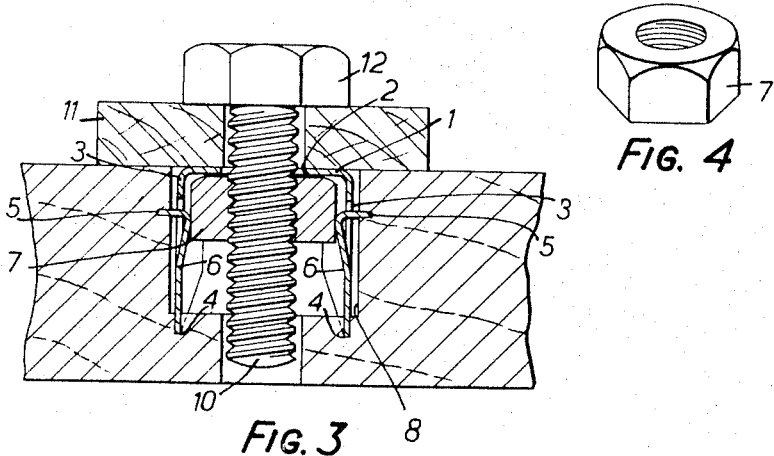
FIGURE 3 is a sectional view on the line A—A of FIGURE 2 showing the position of the parts of the assembly after the nut has been tightened up to secure an article to the support.

The anchoring fastener can be initially assembled in the recess in the manner illustrated in FIGURE 1, and the final anchoring effected by the bolt when it is required to secure an article to the support. Alternatively, the anchoring fastener can be permanently secured by a separate operation before an article is to be assembled with the support and in this case the bolt would be screwed into the nut so as to cause it to move axially within the recess. The bolt would, however, be removed and reinserted when it is required to attach an article to the support. The nut would remain in the position indicated in FIGURE 3 where it is resiliently held by the engagement of the tongues.

The fastener is designed for use with supports made of wood, synthetic plastics or other materials which are sufficiently non-rigid to permit the ends of the tongue portion 5 to be driven into its surface.

I claim:
1. A nut anchor for assembly in a recess in a support, comprising a hollow body including an apertured base and opposed side walls integral with said base and extending in right angle relation therefrom, each of said walls having a pointed free end directed away from the plane of the base, a resilient tongue, stamped from each of said side walls, each of said resilient tongues being integrally connected to each said wall adjacent said each free end, each said resilient tongue having a free end directed laterally outwardly of said side wall and a portion of said tongue extending from said connection spaced axially inwardly of said free end toward said base and disposed radially inwardly of the side wall for engaging a nut to be anchored, said portion of the tongue being disposed at an angle to the axis of the body, said inwardly disposed portion of the tongue being displaceable by the nut, when moved axially within the body toward said base, so as to displace the said free end of the tongue into locking engagement with the wall of the recess, each of the said side walls being disposed so as to lie in a plane parallel to a flat face of a hexagonally shaped nut so as to retain the nut in the said hollow body against relative rotation.

References Cited

UNITED STATES PATENTS

| | | | |
|---|---|---|---|
| 2,404,372 | 7/1946 | Hallock | 151—41.74 |
| 3,269,251 | 8/1966 | Bass | 85—66 |

FOREIGN PATENTS

| | | |
|---|---|---|
| 1,018,678 | 10/1952 | France. |
| 1,134,769 | 12/1956 | France. |
| 1,469,966 | 1/1967 | France. |
| 35,433 | 3/1953 | Poland. |
| 121,499 | 4/1948 | Sweden. |

MARION PARSONS, JR., *Primary Examiner.*

U.S. Cl. X.R.

85—66, 74; 151—41.74, 41.76